US009999042B2

(12) United States Patent
Briggs

(10) Patent No.: US 9,999,042 B2
(45) Date of Patent: Jun. 12, 2018

(54) SMALL CELL RESOURCE ALLOCATION

(71) Applicant: British Telecommunications Public Limited Company, London (GB)

(72) Inventor: Keith Briggs, London (GB)

(73) Assignee: British Telecommnications Public Limited Company, London (GB)

(*) Notice: Subject to any disclaimer, the term of this patent is extended or adjusted under 35 U.S.C. 154(b) by 1 day.

(21) Appl. No.: 15/126,202

(22) PCT Filed: Feb. 27, 2015

(86) PCT No.: PCT/GB2015/050587
§ 371 (c)(1),
(2) Date: Sep. 14, 2016

(87) PCT Pub. No.: WO2015/140501
PCT Pub. Date: Sep. 24, 2015

(65) Prior Publication Data
US 2017/0086181 A1 Mar. 23, 2017

(30) Foreign Application Priority Data
Mar. 18, 2014 (EP) ..................... 14250047

(51) Int. Cl.
*H04W 72/04* (2009.01)
*H04L 5/00* (2006.01)
*H04W 84/04* (2009.01)

(52) U.S. Cl.
CPC ......... *H04W 72/044* (2013.01); *H04L 5/0071* (2013.01); *H04L 5/001* (2013.01); *H04W 84/045* (2013.01)

(58) Field of Classification Search
CPC ................................ H04W 72/00; H04L 5/00
See application file for complete search history.

(56) References Cited

U.S. PATENT DOCUMENTS

| 9,536,021 | B1* | 1/2017 | Link | G06F 17/5009 |
| 2008/0212514 | A1 | 9/2008 | Chen | |
| 2008/0233966 | A1* | 9/2008 | Scheim | H04L 5/0023 455/452.1 |
| 2011/0292890 | A1* | 12/2011 | Kulkarni | H04W 72/0426 370/329 |

(Continued)

FOREIGN PATENT DOCUMENTS

| CN | 103444252 A | 12/2013 |
| WO | WO2016/079016 A1 | 5/2016 |

OTHER PUBLICATIONS

First Notification of Office Action, for CN201580014490.3, dated Mar. 10, 2017, 12 pages.

(Continued)

*Primary Examiner* — Andrew Lai
*Assistant Examiner* — Sumitra Ganguly
(74) *Attorney, Agent, or Firm* — Amy M. Salmela; Patterson Thuente Pedersen, P.A.

(57) ABSTRACT

The disclosure provides a method and small cell for allocating a Resource Block (RB) to a transmission between the small cell and a User Equipment (UE) the method comprising generating a value using a quasi-random, low-discrepancy, number generator, associating the value with a RB and allocating the RB to a transmission between the small cell and the UE.

15 Claims, 9 Drawing Sheets

(56) References Cited

U.S. PATENT DOCUMENTS

2013/0237227 A1* 9/2013 Nagaraja ............... H04W 16/10
  455/436
2014/0036878 A1* 2/2014 McNamara ....... H04W 72/1289
  370/336

OTHER PUBLICATIONS

PCT International Search Report for PCT/GB2015/050587, dated Jun. 11, 2015, 3 pages.
PCT Written Opinion of the International Searching Authority for PCT/GB2015/050587, dated Jun. 11, 2015, 5 pages.
PCT International Preliminary Report on Patentability for PCT/GB2015/050587, dated Feb. 9, 2016, 6 pages.
"Algorithm 659: Implementing Sobol's quasirandom sequence generator", P. Bratley and B. L. Fox (1988), ACM Trans. Math. Softw. 14, 88-100.
"Remark on Algorithm 659: Implementing Sobol's quasirandom sequence generator", S. Joe and F. Y. Kuo (2003), ACM Trans. Math. Softw. 29, 49-57.
European Search Report on EP application No. 14250047, dated Aug. 19, 2014, 6 pages.
"Throughput Optimization, spectrum allocation, and access control in two-tier femtocell networks" W.C. Cheung et al., IEEE Journal on Selected Areas in Communications, vol. 30, No. 3, Apr. 2012, pp. 561-574.
Sobol source code, Francis Y. Kuo, Oct. 21, 2008, 4 pgs.
Sobol sequence generator, Joe and Kuo, 2008, 3 pgs.
"Self-Organization for LTE Enterprise Femtocells" de la Roche et al., 5 pgs.
"Distributed and Autonomous Resource Allocation for Femto-Cellular Networks", Burchardt et al., Asilomar 2012, pp. 1765-1769.
"A Pseudo-Random Subchannel Selection Scheme for Downlink Interference Migitgation in Two-Tier Cellular Networks", Wang et al., (Chinacom), 2012 IEEE, pp. 524-529.
"Distributed Resource Allocation for Femtocell Interference Coordination via Power Minimization" Ladanyi et al., Enabling Green Wireless Multimedia Communications, 2011 IEEE, pp. 744-749.
"Resource Allocation with Interference Avoidance in OFDMA Femtocell Networks", Liang et al., IEEE Transactions on Vehicular Technology, vol. 61, No. 5, IPNL 2012, pp. 2243-2255.
"Cognitive Radio Resource Management for QoS Guarantees in Autonomous Femtocell Networks" Lien et al., IEEE ICC 2010, 6 pgs.
"Notes on generating Sobol' sequences", Joe and Kuo, Aug. 2008, 3 pgs.
"Radio Resource Management Considerations for LTE Femto Cells" Kulkarni et al., ACM SIGCOMM Computer Communication Review, vol. 40, No. 1, Jan. 2010, pp. 26-30.
"LTE Frame Structure and Resource Block Architecture", retrieved from http://www.teletopix.org/4g-lte/lte-frame-structure-and-resource-block-architecture/ on Oct. 3, 2014, 4 pgs.

* cited by examiner

SMALL CELL RESOURCE ALLOCATION

RELATED APPLICATIONS

The present application is a National Phase entry of PCT Application No. PCT/GB2015/050587, filed on Feb. 27, 2015, which claims priority to EP Patent Application No. 14250047.9, filed on Mar. 18, 2014, which are hereby fully incorporated herein by reference.

TECHNICAL FIELD

The present disclosure relates to resource allocation in small cell systems.

BACKGROUND 4G networks are the fourth generation of mobile telecommunication technology standards, and include the WiMAX and LTE-Advanced network standards. The 4G networks include a new architecture to support a small-scale evolved Node B (eNodeB), which may be installed in private homes (known as a femto access point, or femtocell), or outdoor areas (known as metrocells or picocells, depending on the coverage area). These cells are collectively known as small cells.

Small cells are expected to be widely adopted. However, as small cells are designed to be deployed by end-users with minimal intervention from Mobile Network Operators (MNOs), several issues arise. For example, if two small cells have overlapping coverage areas (as shown in FIG. 1) but transmit using the same frequency and time slots, then signals from these two small cells will interfere with each other and data throughput is significantly reduced. This form of interference is known as co-tier, as the interference is between two elements on the same tier of the network. There may also be interference between signals from the macrocell and small cell when they use the same frequency and time slots, known as cross-tier interference. To address these issues and minimize interference in the network, MNOs employ various resource management techniques.

A first example of a conventional resource management technique involves a small cell determining the resources used by other small cells and allocating its resources and power usage accordingly. In a second example, a centralized resource management system determines the topology and resource demands of the network and allocates the resources to each small cell. In both these examples there is an extra processing demand imposed on the small cells, as they must determine and report their resource allocations and process any signals received from other small cells or the management system. Furthermore, there is an increase in control traffic on the network to carry all these extra signals, which may be significant for extensive small cell deployment.

A third example of a conventional resource management technique involves a small cell independently determining its resource allocation. This technique is more desirable than the two examples above, as the processing burden on the small cell is relatively small and it does not increase the control traffic on the network. There are several implementations of this technique. Firstly, the small cells may each allocate their own resources randomly (for example, by using a random or pseudorandom number generator). Although this simplifies the computation, it results in a greater level of interference compared to the first and second examples detailed above. This problem is exacerbated by such number generators producing 'clusters' of numbers (i.e. wherein parts of a sequence have a greater density of points compared to others).

An improvement of the independent resource management technique involves small cells using various parameters to calculate their resource allocations. These parameters may include the data rate required by users or the measured interference for each resource block. The small cell may determine these parameters from measurement reports from a User Equipment (UE). This technique produces an improved resource allocation (i.e. less interference) than the random technique above, but incurs a penalty of increased traffic between the small cell and UE.

Given the limitations of the independent techniques, small cell vendors have generally opted for the first and second examples above. However, there are further complications as small cells from separate operators (using incompatible techniques) will be deployed in the same coverage area.

US Patent Application Publication Number 2008/0233966 A1 discloses a method of pseudorandom resource allocation in OFDM communication systems. This disclosure therefore suffers from the issues of random and pseudorandom allocation discussed above.

It is therefore desirable to alleviate some or all of the above problems.

SUMMARY

According to a first aspect of the disclosure, there is provided a method of allocating a Resource Block (RB) to a transmission between a small cell and a User Equipment (UE) the method comprising: a) generating a value using a quasi-random, low-discrepancy, number generator; b) associating the value with a Resource Block (RB); and c) allocating the RB to a transmission between a small cell and a User Equipment (UE).

The present disclosure may therefore allocate an RB to a transmission based on a value generated by a quasi-random number generator. The quasi-random number generator may be configured to generate a sequence of numbers having a property of low-discrepancy, such that each new point has a degree of dependence on a previously generated point. The quasi-random number generator therefore avoids the problem of 'clustering' experienced by prior art random number generators. Simulations by the present inventor have shown that the number of RB collisions (i.e. interference) is reduced when several small cells employ the method of the present invention, compared to the random number generator technique of the prior art.

Furthermore, the method of the present disclosure has the additional benefits of minimizing the processing burden on the small cell and having no impact on the control traffic load on the wireless network.

A plurality of RBs may be allocated to the transmission between the small cell and the UE, and the method may further comprise: d) determining if a count of RBs allocated to the transmission between the small cell and the UE is less than the plurality of RBs to be allocated; and e) if the count of RBs is less than the plurality of RBs to be allocated, return to a). In most scenarios, the small cell will allocate a number of RBs to a transmission, and the process may be repeated iteratively until all RBs are allocated using the quasi-random number generator.

Task c) may further comprise: i) determining if the RB has already been allocated to the transmission between the small cell and the UE; and, if the RB has already been allocated, ii) selecting an alternative RB; iii) determining if the alternative RB has already been allocated to the transmission between the small cell and the UE; and iv) allocating the alternative RB to the transmission between the small cell and the UE. Thus, if the RB selected by the quasi-random number generator has already been allocated, an alternative RB may be selected and allocated instead.

Task a) may further comprise: i) generating a plurality of rejected values using the quasi-random number generator; ii) removing the plurality of rejected values from a range of values; and iii) generating the value using the quasi-random number generator from the range of values. The method may therefore thin the range of possible values which may be selected for the RB allocation by removing a set of rejected values (generated by the quasi-random number generator) from this range. This two-stage approach decreases the chances that two small cells implementing this technique will both select the same RB.

The quasi-random number generator may be a Sobol' quasi-random number generator.

The small cell may send the RB allocation to the UE, and the small cell and the UE may send and receive signals based on the RB allocation.

A computer program is provided containing computer-executable code which, when executed on a computer, causes the computer to perform the method of the first aspect of the present disclosure.

According to a second aspect of the disclosure, there is provided a small cell adapted to allocate a Resource Block (RB) to a transmission with a User Equipment (UE) the small cell comprising a transceiver adapted to communicate with a User Equipment (UE) using a Resource Block (RB) allocation; and a processor adapted to a) generate a value using a quasi-random, low-discrepancy, number generator, b) associate the value with a Resource Block, RB, and c) allocate the RB to a transmission between the transceiver and the UE.

The small cell may be adapted to allocate a plurality of RBs to the transmission with a UE, wherein the processor may be further adapted to: d) determine if a count of RBs allocated to the transmission between the small cell and the UE is less than the plurality of RBs to be allocated, and e) if the count of RBs is less than the plurality of RBs to be allocated, return to a).

For c), the processor may be further adapted to: i) determine if the RB has already been allocated to the transmission between the small cell and the UE, and, if the RB has already been allocated, ii) select an alternative RB, iii) determine if the alternative RB has already been allocated to the transmission between the small cell and the UE, and iv) allocate the alternative RB to the transmission between the small cell and the UE.

For a), the processor may be further adapted to: i) generate a plurality of rejected values using the quasi-random number generator; ii) remove the plurality of rejected values from a range of values; and iii) generate the value using the quasi-random number generator from the range of values.

The transceiver may be further adapted to transmit a signal to the UE based on the RB allocation, and may be further adapted to send the RB allocation to the UE.

The small cell may be a femtocell, and may be part of a wireless network.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
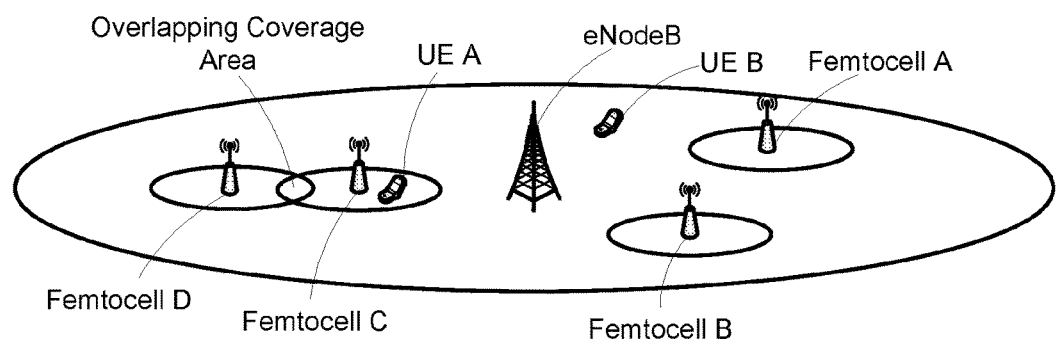
FIG. 1 is a diagram illustrating a macrocell, a plurality of femtocells, A to D, and a plurality of User Equipments, A and B, of the prior art, wherein femtocells C and D have an overlapping coverage area.
Figure 2:
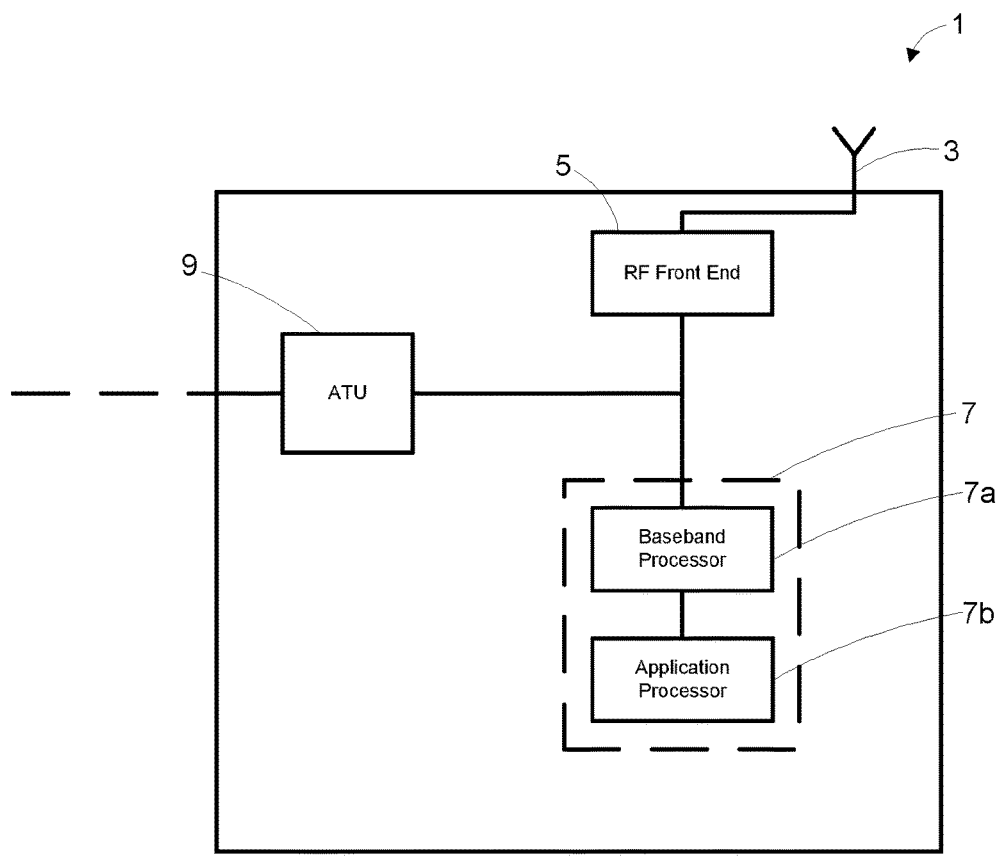
FIG. 2 is a schematic diagram of a femtocell of a first embodiment of the present disclosure.

A first embodiment of the present disclosure will now be described with reference to FIGS. 2 to 9. FIG. 2 is a schematic diagram of a femtocell 1, including an antenna 3, an RF front end 5, a processor 7 (including a baseband processor 7a and application processor 7b) and an ADSL terminal unit, ATU, 9. As is known in the art, the RF front end 5 is a module adapted to process RF signals sent and received via the antenna 3, the baseband processor 7a acts as a mobile termination component adapted to perform common RF transmission functions (e.g. encoding, decoding, error detection etc.), and the application processor 7b acts as a terminal equipment component adapted to process high level functions. The processor 7 is connected to both the RF front end 5 and ATU 9.

In this embodiment, the baseband processor 7a is adapted for communications in accordance with the LTE protocol stack (i.e. L1, MAC, RLC, PDCP, RRC). The baseband processor 7a may therefore act as a scheduler (e.g. a MAC scheduler) for allocating Resource Blocks for transmissions between the femtocell 1 and a User Equipment (UE) 100. The scheduling information may be transmitted to the UE 100 via the RF front end 5 and antenna 3.

Figure 3:
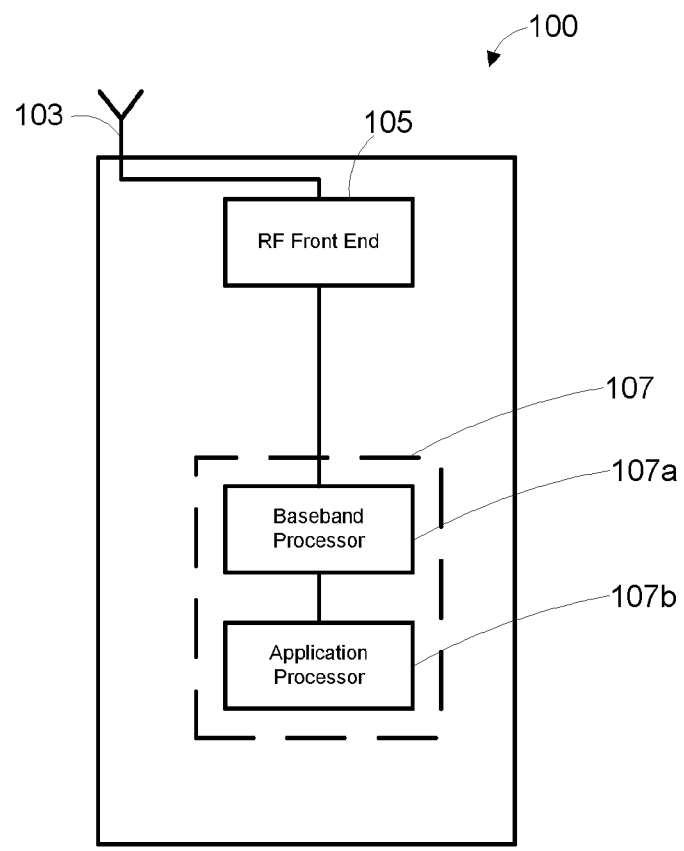
FIG. 3 is a schematic diagram of a UE of the first embodiment.

A UE 100 is illustrated in FIG. 3. The UE 100 includes an antenna 103, an RF front end 105 and a processor 107 (including a baseband processor 107a and application processor 107b). The baseband processor 107a is adapted for communications in accordance with the LTE protocol stack (i.e. L1, MAC, RLC, PDCP, RRC), and is adapted to receive the scheduling information (including the schedule of Resource Blocks allocated for transmissions between the UE 100 and the femtocell 1) and configure its transmissions to the femtocell 1 accordingly.

Figure 4:
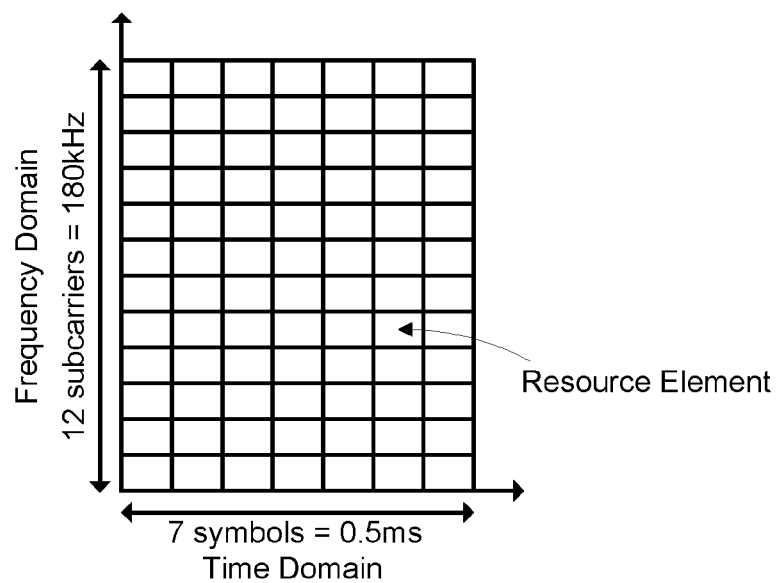
FIG. 4 illustrates a Resource Block.

The Resource Block will now be described in more detail. A Resource Block represents a basic unit of resource for the LTE air-interface. When transferring data between the femtocell 1 and UE 100, the femtocell 1 scheduler (in this case, the MAC scheduler of the baseband processor 7a) must allocate a plurality of Resource Blocks for the transfer. A Resource Block (as shown in FIG. 4) occupies a single 0.5 ms slot in the time domain, which is divided into several (usually 6 or 7) Orthogonal Frequency-Division Multiple Access (OFDMA) symbols, and, in the frequency domain, is divided into 12 subcarriers (each 15 Hz). The Resource Block therefore defines a grid of 72 or 84 Resource Elements, wherein each Resource Element can accommodate a single modulation symbol. The bit rate for the data transmission is thus defined by the number of Resource Blocks (and thus the number of Resource Elements, each accommodating one symbol) allocated to the transmission in the frequency domain and the modulation technique used.

Figure 5:
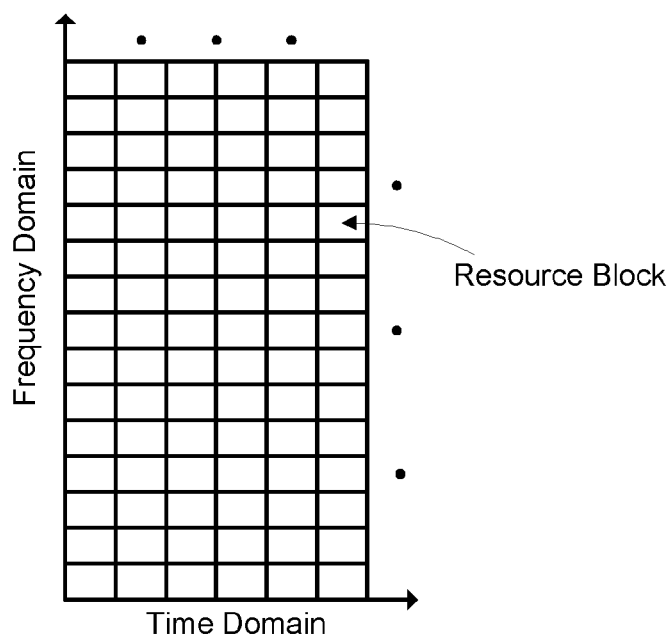
FIG. 5 illustrates a matrix of Resource Blocks.

FIG. 5 is a matrix illustrating n Resource Blocks in the frequency domain and m Resource Blocks in the time domain. The processor 7 may therefore allocate up to n*m Resource Blocks for a transmission between the small cell and a UE. In practice, only a proportion of Resource Blocks are necessary for a required data rate (e.g. only 15 Resource Blocks are required for a data rate of 15.12 Mbps using 64QAM modulation).

The femtocell 1 processor 7 may therefore configure a data transmission by determining the number of Resource Blocks required (which may be based on the required data rate), and allocating the Resource Blocks for that transmission. The femtocell 1 processor 7 allocates Resource Blocks according to a method of the present invention (described below), which reduces the number of Resource Block collisions compared to the prior art random number generator technique. The skilled person will understand that a Resource Block collision may occur when another femtocell, having an overlapping coverage area with the femtocell 1, transmits using the same Resource Block.

Figure 6:
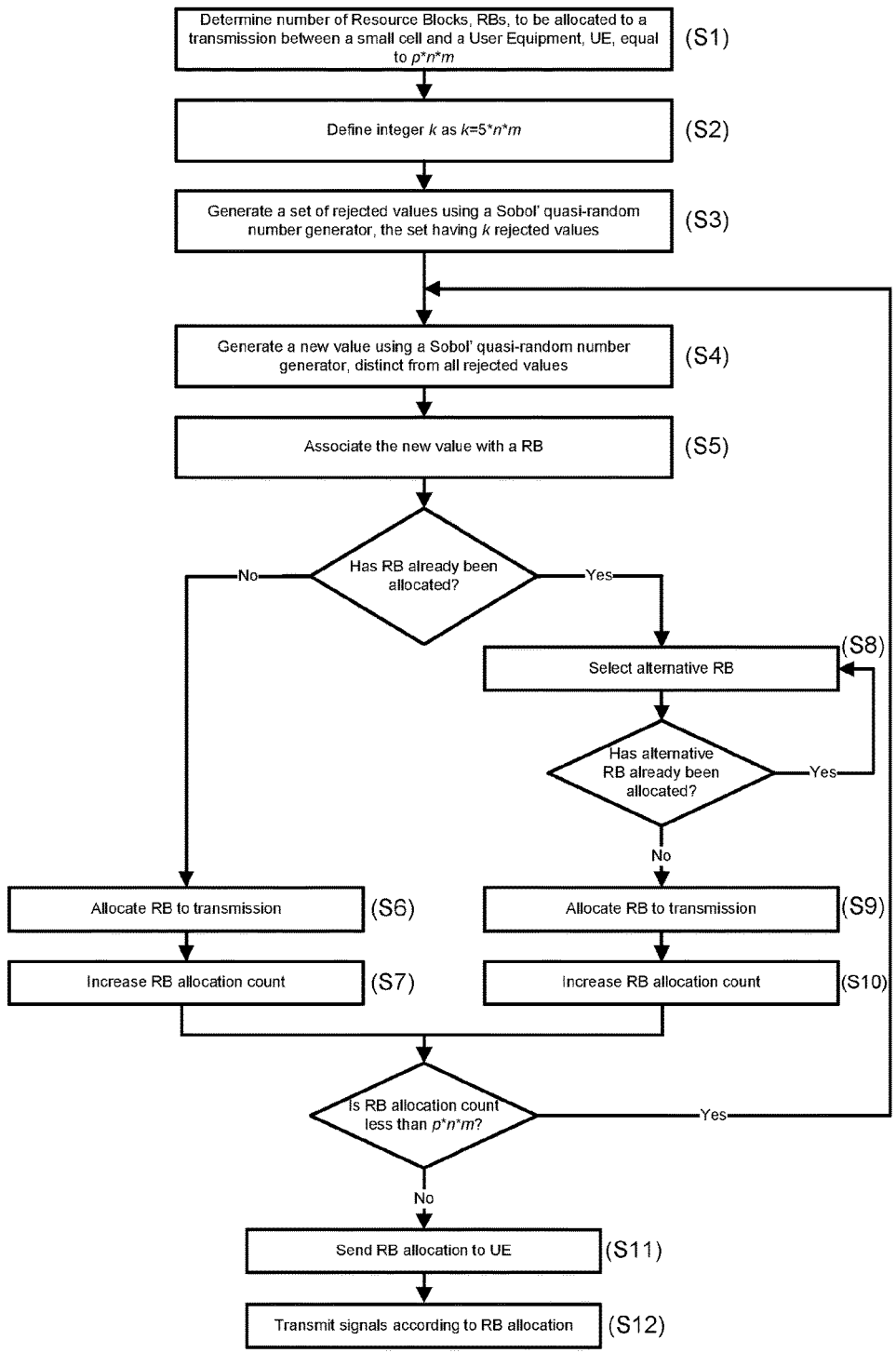
FIG. 6 is a flow diagram illustrating a first embodiment of a method of the present disclosure.

A first embodiment of a method of allocating Resource Blocks will now be described with reference to FIG. 6. In this embodiment, a 15×6 matrix of Resource Blocks is defined in the frequency and time domains. A fraction p of these Resource Blocks are to be allocated (where p is greater than 0 and less than 1) for transmission between the femtocell 1 and UE 100. The processor 7 may therefore determine how many Resource Blocks are required for a transmission between the femtocell 1 and UE 100 (S1)

In S2, an integer k is defined as k=5*n*m (which, in this embodiment, is 450). A Sobol' two-dimensional quasi-random number generator is then iterated for 450 steps, producing a first sequence of two-dimensional values (S3). Each two-dimensional value (which, in this embodiment, is computer to 16 decimal places) in this first sequence cannot be used as a Resource Block allocation, as explained in more detail below.

The following steps are then iteratively performed until all Resource Blocks (i.e. p*n*m Resource Blocks) have been allocated. In S4, the Sobol' two-dimensional quasi-random number generator generates a new value. The algorithm is configured such that the new value cannot be a value of the first sequence of two-dimensional values, generated in S3 above. In this embodiment, the Sobol' two-dimensional quasi-random number generator defines a range of possible values, and removes all values generated in S3 above from this range. Thus, in S4 onwards, the Sobol' quasi-random number generator may only select a value from this reduced range of possible values.

Figure 7:
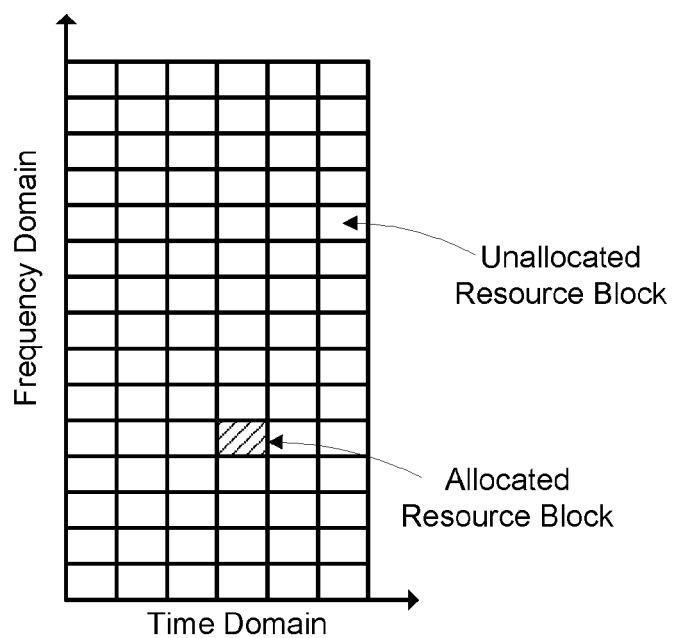
FIG. 7 illustrates a matrix of Resource Blocks, wherein one Resource Block has been allocated by the method of FIG. 6.

The new value is associated with a Resource Block (S5). For example, if the new value is [⅓, ⅔] and the matrix includes 15 Resource Blocks in the frequency domain and 6 Resource Blocks in the time domain, the new value may be discretized to the Resource Block identified by coordinates 5, 4 (i.e. the $5^{th}$ Resource Block in the frequency domain and the $4^{th}$ Resource Block in the time domain), as shown in FIG. 7.

If this Resource Block has not yet been allocated (which will be the case for the first Resource Block), then the processor 7 allocates this block for the transmission (S6) and a counter for the number of Resource Block allocations is incremented (S7).

In S8, the processor 7 determines whether enough Resource Blocks have been allocated by comparing the count of the number of Resource Block allocations to the number of Resource Blocks to be allocated (determined in S1). In this example, the count is less than p*n*m, so the process loops back to S4 and another new value is generated by the Sobol' two-dimensional quasi-random number generator.

As before, the new value is discretized into Resource Block coordinates, the corresponding Resource Block is identified and allocated, and the count of Resource Block allocations is incremented. The matrix of Resource Blocks after several iterations of the method is shown in FIG. 8.

If the new value is associated with a Resource Block that has already been allocated (for example, if the new value is associated with the Resource Block having coordinates 5, 4) then another Resource Block is allocated instead by selecting an alternative Resource Block (S8), checking if it has already been allocated and, if not, allocating the alternative Resource Block to the transmission (S9) and incrementing the count of allocated Resource Blocks (S10).

Figure 8:
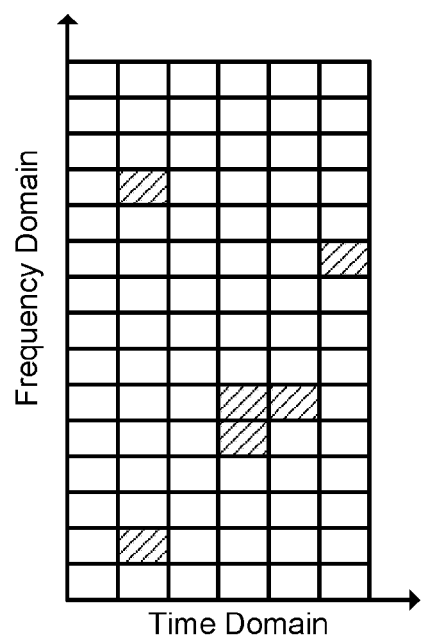
FIG. 8 illustrates the matrix of Resource Blocks, wherein several Resource Blocks have been allocated by the method of FIG. 6.

In this embodiment (as shown in FIG. 8), the processor 7 determines whether Resource Blocks around the identified Resource Block have already been allocated by checking Resource Blocks sequentially in a spiral manner (in this example, Resource Block 6, 4 is checked first, then 6, 5, then 5, 5, then 4, 4, then 3, 4, and so on), until a Resource Block that hasn't yet been allocated is identified. Thus, in this example, if the new value is associated with Resource Block 5, 4, which has already been allocated, then Resource Block 5, 5 is allocated instead. The counter for the number of Resource Block allocations is then incremented.

The processor 7 repeats these tasks until the count of Resource Block allocations equals the total number of Resource Block allocations required (i.e. the integer part of p*n*m).

Once all the Resource Blocks have been allocated, the femtocell 1 and UE 100 may communicate using this resource allocation. Accordingly, the processor 7 sends the scheduling information (i.e. from the MAC scheduler in the baseband processor 7a, via the RF front end 5 and antenna 3) to the UE 100 (S11). The femtocell 1 and UE 100 then communicate using the allocated Resource Blocks as detailed in the scheduling information (S12).

In the above method, a Sobol' quasi-random number generator is used. However, the skilled person will understand that any form of quasi-random number generator is suitable for the present disclosure. A quasi-random number generator generates a sequence of numbers wherein each new value has a degree of dependence on a previously generated value. Furthermore, the probability that the quasi-random number generator produces a new value that lies further away from all previously generated values is greater than when using the random number generator technique of the prior art.

The quasi-random number generator (sometimes known as low-discrepancy number generator) therefore avoids the problem of 'clustering' afflicting the prior art random number generators. The method of the present disclosure, when implemented by two or more femtocells having an overlapping coverage area, may therefore produce fewer Resource Block collisions than the prior art random number generator technique.

Figure 9:
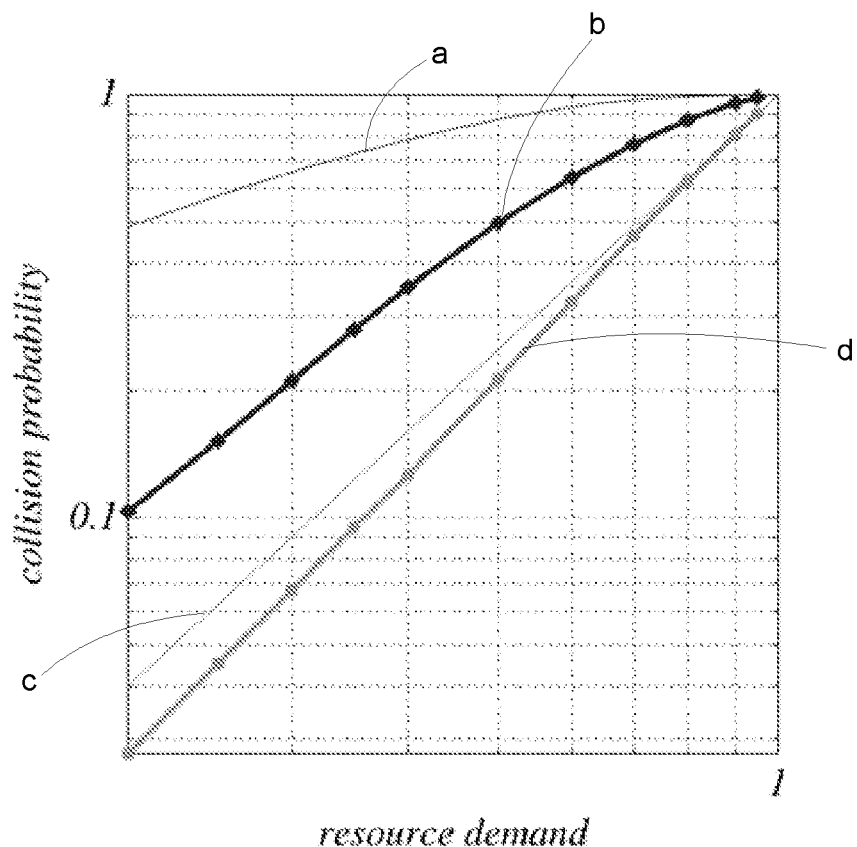
FIG. 9 is a graph illustrating the collision probability against the resource demand for two and three small cells having an overlapping coverage area, for both the prior art random number generator technique and for the method of FIG. 6.

Results of a simulation of a plurality of femtocells implementing the method of the present invention are shown in FIG. 9. FIG. 9 is a graph showing the relationship of collision probability against resource demand on a logarithmic scale for a) two femtocells implementing the prior art random number generator technique (which is $p^2$ when the probability of a Resource Block being allocated is p), b) two femtocells implementing the method of the present disclosure, wherein the collision probability is expressed as a function of p, c) three femtocells implementing the prior art random number generator technique, wherein the collision probability is expressed as a function of p, and d) three femtocells implementing the method of the present disclosure, wherein the collision probability is expressed as a function of p. FIG. 9 therefore illustrates that the collision probability is less than the prior art random number generator technique. Furthermore, the collision probability is further reduced when the resource demand decreases (such that fewer Resource Blocks need to be allocated).

In the above embodiment, the processor implements a Sobol' two-dimensional quasi-random number generator. This may be achieved by running a Sobol' quasi-random number generator to produce the frequency domain part of the value, and running the Sobol' quasi-random number generator a second time to produce the time domain part of the value. Details of the Sobol' number generator and its implementation in programming language C++ can be found at http://web.maths.unsw.edu.au/~fkuo/sobol/ and papers, "Algorithm 659: Implementing Sobol's quasirandom sequence generator", P. Bratley and B. L. Fox (1988), ACM Trans. Math. Softw. 14, 88-100, and "Remark on Algorithm 659: Implementing Sobol's quasirandom sequence generator", S. Joe and F. Y. Kuo (2003), ACM Trans. Math. Softw. 29, 49-57.

In the above embodiments, a femtocell is used to implement the method of the present disclosure. However, the skilled person will understand that the present disclosure is applicable to all forms of small cell, such as picocells, microcells, metrocells etc. Also, it is non-essential that the method of the present disclosure is implemented by a MAC scheduler of a baseband processor. Any processing unit on a small cell may be configured to implement the method of the present disclosure.

The skilled person will understand that the present disclosure is also applicable for allocating Resource Blocks on smalls cells operating on any protocol. The term Resource Block may also be known as Physical Resource Block, or PRB.

Furthermore, the description above specifies a 15×6 matrix of Resource Blocks. However, the skilled person will understand that any sized matrix may be used, and will generally be defined to accommodate the number of Resource Blocks to be allocated for a particular transmission.

In S3 of the method described above, the range of values that may be generated by the quasi-random number generator is thinned by removing any value in a set of rejected values generated by the quasi-random number generator. The number of values is equal to five times the number of Resource Blocks in the matrix. However, the skilled person will understand that the set of rejected values can be of any size (wherein a smaller size will require less computation, but increases the chances of a Resource Block collision). Furthermore, this task is non-essential.

In the above embodiments, the processor selects an alternative Resource Block when the identified Resource Block has already been allocated by checking Resource Blocks sequentially in a spiral manner. This minimizes the number of searches required, whilst keeping the distance between the alternative Resource Block and the identified Resource Block to a minimum. However, the skilled person will understand that the task of checking Resource Blocks in a sequential manner is non-essential. Furthermore, the skilled person will also understand that the task of selecting an alternative Resource Block is non-essential. That is, the method may be repeated again until a free Resource Block has been identified.

The skilled person will understand that any combination of features is possible within the scope of the disclosure, as claimed.

The invention claimed is:

1. A method of allocating a Resource Block (RB) to a transmission between a small cell and a User Equipment (UE), the method comprising:
   a) generating a value using a quasi-random, low-discrepancy, number generator;
   b) associating the value with the RB; and
   c) allocating the RB to the transmission between the small cell and the UE,
   wherein a plurality of RBs are to be allocated to the transmission between the small cell and the UE, such that the method further comprises:
   d) determining if a count of RBs allocated to the transmission between the small cell and the UE is less than the plurality of RBs to be allocated; and
   e) if the count of RBs is less than the plurality of RBs to be allocated, repeating the generating, the associating, and the allocating for one of the plurality of RBs not yet allocated.

2. The method of claim 1, wherein the allocating further comprises:
   i) determining if the RB has already been allocated to the transmission between the small cell and the UE; and, if the RB has already been allocated,
   ii) selecting an alternative RB;
   iii) determining if the alternative RB has already been allocated to the transmission between the small cell and the UE; and, if the alternative RB has not been allocated,
   iv) allocating the alternative RB to the transmission between the small cell and the UE.

3. The method of claim 1, wherein the generating further comprises:
   i) generating a plurality of rejected values using the quasi-random number generator;
   ii) removing the plurality of rejected values from a range of values; and
   iii) generating the value using the quasi-random number generator from the range of values.

4. The method of claim 1, wherein the quasi-random number generator is a Sobol' quasi-random number generator.

5. The method of claim 1, further comprising:
   transmitting a signal between the small cell and the UE based on the RB allocation.

6. The method of claim 1, further comprising:
   sending the RB allocation by the small cell to the UE.

7. A non-transitory computer-readable storage medium storing a computer program containing computer-executable code which, when executed on a computer, causes the computer to perform the method of claim 1.

8. A small cell adapted to allocate a Resource Block (RB) to a transmission with a User Equipment (UE), the small cell comprising:
- a transceiver adapted to communicate with the UE using an RB allocation; and
- a processor adapted to
  - a) generate a value using a quasi-random, low-discrepancy, number generator,
  - b) associate the value with the RB, and
  - c) allocate the RB to the transmission between the transceiver and the UE,
- wherein the small cell is adapted to allocate a plurality of RBs to the transmission with the UE, such that the processor is further adapted to
  - d) determine if a count of RBs allocated to the transmission between the small cell and the UE is less than the plurality of RBs to be allocated, and
  - e) if the count of RBs is less than the plurality of RBs to be allocated, repeat the generating, the associating, and the allocating for one of the plurality of RBs not yet allocated.

9. The small cell of claim 8, wherein, to allocate, the processor is further adapted to:
  - i) determine if the RB has already been allocated to the transmission between the small cell and the UE, and, if the RB has already been allocated,
  - ii) select an alternative RB,
  - iii) determine if the alternative RB has already been allocated to the transmission between the small cell and the UE, and, if the alternative RB has not already been allocated,
  - iv) allocate the alternative RB to the transmission between the small cell and the UE.

10. The small cell of claim 8, wherein, to generate, the processor is further adapted to:
  - i) generate a plurality of rejected values using the quasi-random number generator;
  - ii) remove the plurality of rejected values from a range of values; and
  - iii) generate the value using the quasi-random number generator from the range of values.

11. The small cell of claim 8, wherein the quasi-random number generator is a Sobol' quasi-random number generator.

12. The small cell of claim 8, wherein the transceiver is further adapted to transmit a signal to the UE based on the RB allocation.

13. The small cell of claim 8, wherein the transceiver is further adapted to send the RB allocation to the UE.

14. The small cell of claim 8, wherein the small cell is a femtocell.

15. A wireless network comprising the small cell of claim 8.

* * * * *